(12) United States Patent
Lamb et al.

(10) Patent No.: US 6,510,799 B2
(45) Date of Patent: Jan. 28, 2003

(54) APPARATUS, SYSTEMS AND METHODS FOR LEVITATING AND MOVING OBJECTS

(75) Inventors: Karl J. Lamb, Sequim, WA (US); Toby Merrill, Port Angeles, WA (US); Scott D. Gossage, Port Angeles, WA (US); Michael T. Sparks, Port Angeles, WA (US); Michael S. Barrett, Port Angeles, WA (US)

(73) Assignee: Magna Force, Inc., Port Angeles, WA (US)

( * ) Notice: Subject to any disclaimer, the term of this patent is extended or adjusted under 35 U.S.C. 154(b) by 0 days.

(21) Appl. No.: 09/898,536

(22) Filed: Jul. 2, 2001

(65) Prior Publication Data

US 2003/0000415 A1 Jan. 2, 2003

(51) Int. Cl.⁷ ................................................. B60L 13/00
(52) U.S. Cl. ...................................... 104/281; 104/282
(58) Field of Search ................................. 104/281, 282, 104/286, 283, 292, 284, 290, 294; 105/29.1; 310/12, 13, 14, 15

(56) References Cited

U.S. PATENT DOCUMENTS

| | | | | |
|---|---|---|---|---|
| 3,320,903 A | | 5/1967 | Knolle | 104/20 |
| 3,791,309 A | * | 2/1974 | Baermann | 104/148 MS |
| 3,845,720 A | * | 11/1974 | Bohn et al. | 104/148 MS |
| 4,074,153 A | | 2/1978 | Baker et al. | 310/12 |
| 4,151,431 A | | 4/1979 | Johnson | 310/12 |
| 4,215,330 A | | 7/1980 | Hartman | 335/306 |
| 4,356,772 A | * | 11/1982 | van der Heide | 104/282 |
| 4,600,849 A | | 7/1986 | Lawson et al. | 310/103 |
| 4,805,761 A | | 2/1989 | Totsch | 198/619 |
| 4,877,983 A | | 10/1989 | Johnson | 310/12 |
| 5,174,215 A | * | 12/1992 | Barrows | 104/288 |
| 5,208,496 A | | 5/1993 | Tozoni et al. | 310/12 |
| 5,251,741 A | | 10/1993 | Morishita et al. | 198/690.1 |
| 5,263,419 A | * | 11/1993 | Moroto et al. | 104/290 |
| 5,317,976 A | * | 6/1994 | Aruga et al. | 104/282 |
| 5,402,021 A | * | 3/1995 | Johnson | 310/12 |
| 5,431,109 A | | 7/1995 | Berdut | 104/283 |
| 5,452,663 A | * | 9/1995 | Berdut | 104/283 |
| 5,467,718 A | | 11/1995 | Shibata et al. | 104/284 |
| 5,722,326 A | | 3/1998 | Post | 104/281 |
| 6,101,952 A | * | 8/2000 | Thornton et al. | 104/282 |
| 6,129,193 A | | 10/2000 | Link | 192/84.1 |
| 6,155,511 A | | 12/2000 | Tadera et al. | 242/354 |
| 6,230,866 B1 | | 5/2001 | Link | 192/84.1 |

FOREIGN PATENT DOCUMENTS

JP          52-64711 A     * 11/1975

OTHER PUBLICATIONS

Jasdamun, Anick, "High–Tech Train Travel," *The Associated Press*, Aug. 10, 1998.
Jasdamun, Anick, "Seven Maglev Train Finalists," *The Associated Press*, May 25, 1999.

(List continued on next page.)

Primary Examiner—S. Joseph Morano
Assistant Examiner—Frantz F. Jules
(74) Attorney, Agent, or Firm—Seed Intellectual Property Law Group PLLC

(57) ABSTRACT

Apparatus, systems and methods for levitating and moving objects are shown and described herein. The embodiments incorporate a track with lower rails having permanent magnets abutted against each other and aligned such that the upper surface of each of the lower rails has a uniform polarity; and the object with upper rails having permanent magnets aligned with the lower rails and oriented to oppose the polarity of the lower permanent magnets. Ferrous backing plates behind the lower rails and/or the upper rails may be incorporated. Embodiments may also incorporate a third rail of an electroconductive material, and a driving disc positioned near the third rail. Permanent magnets in the driving disc may be rotated with the driving disc in the presence of the third rail to accelerate the upper rails with respects to the lower rails.

29 Claims, 8 Drawing Sheets

OTHER PUBLICATIONS

Post, Richard E., "*Inductrack Passive Magnetic Levitation*". *Supported–Vehicle Automated Peoplemover (APM) Technologies*.

*The ROMAG Maglev PRT Technology*.

Gluck, S.J., et al., *Design and Commercialization of the PRT 2000 Personal Rapid Transit System*. Available at http://faculty.washington.edu/~jbs/itrans/PRT/PRT2000_Concept.html.

*PMB Projects*, "*Passive electromagnetic suspension for rotor applications:*".

Heller, Arnie, *A New Approach for Magnetically Levitating Trains—and Rockets*.

Grata, Joe, "Region's plans for high–speed maglev train are surprisingly advanced, with 2006 launch target," *Post-Gazzette.com*, Jan. 28, 2001. Available at http://www.post-gazette.com/regionstate/20010128maglevpghmainreg2.asp.

Southern California Association of Governments,"California Maglev Development Program Business Plan," May 3, 2001.

*MagneTrak®* by Swisslog Translift.

*Linear Synchronous Motors (LSMs)*.

\* cited by examiner

APPARATUS, SYSTEMS AND METHODS FOR LEVITATING AND MOVING OBJECTS

BACKGROUND OF THE INVENTION

1. Field of Invention

The invention relates to apparatus, systems and methods for moving objects. More particularly, the invention relates to levitating, accelerating and decelerating objects with reduced friction and increased efficiency.

2. Description of the Related Art

Magnetically levitated trains, conveyor systems and related means of transportation have been attempted many times in the past few decades in an effort to provide more efficient means of transportation for individuals and cargo. A few examples of such systems can be seen in U.S. Pat. Nos. 4,356,772 to van der Heide; 4,805,761 to Totsch; and 5,601,029 to Geraghty et al. These systems operate on the general property that magnets having like polarities repel each other, and magnets having opposite polarities attract each other. Notwithstanding the fact that patent applications have been filed for such systems for decades, a system for moving people and cargo that is viable under real world conditions has yet to be developed.

SUMMARY OF THE INVENTION

The present invention is directed towards apparatus, systems and methods for levitating and accelerating objects. In particular, embodiments of the present invention allow objects to be magnetically levitated and magnetically accelerated with respect to rails, such as train tracks.

In one embodiment, the system incorporates a number of lower rails spaced laterally apart from each other, and an object having a number of upper rails aligned with the lower rails. The lower rails have permanent magnets abutted one against the next and aligned such that the upper surface of the lower rail has a uniform polarity along its length. The lower rail also has a ferrous backing plate that electroconductively couples the permanent magnets along the length of the track. The upper rails have a number of permanent magnets aligned to oppose the magnets in the lower rails to levitate the object. The upper rails also have a ferrous backing plate electroconductively coupling the permanent magnets.

Another embodiment of the invention comprises a number of first rails, an object to be transferred, a third rail, and a driving disc. The first rails each have a number of permanent magnets aligned near its upper surface. The permanent magnets are oriented to create a uniform polarity along a length of each of the first rails. The object being transported has second rails that are configured to align with the first rails. The second rails have permanent magnets mounted thereon that are oriented to oppose the polarity of the magnets in the first rails. Consequently, the object levitates above the first rails. The third rail extends along the length of the first rails. The third rail is made from an electroconductive material, such as copper or aluminum. The disc is connected to the object being transported, and rotates with respect to the object. The disc carries a number of permanent magnets. The disc is positioned such that the permanent magnets are in close proximity to the third rail during operation. Rotation of the disc, and more importantly the permanent magnets, in the proximity of the third rail results in eddy currents that accelerate the object along the third rail in a direction opposite the relative rotation of the disc.

DETAILED DESCRIPTION OF THE ILLUSTRATED EMBODIMENTS

The present detailed description is generally directed toward systems, apparatus and methods for levitating a cart or other object above a track, and for accelerating the object with respect to the track. Several embodiments of the present invention may allow an individual to levitate an object above a track, and to accelerate and decelerate the object, all without contacting the track. Accordingly, such embodiments can provide highly efficient transportation means for individuals or cargo. Many specific details of certain embodiments of the invention are set forth in the following description and in FIGS. 1–8 to provide a thorough understanding of such embodiments. One skilled in the art, however, will understand that the present invention may have additional embodiments or may be practiced without several of the details described in the following description.

Figure 1:
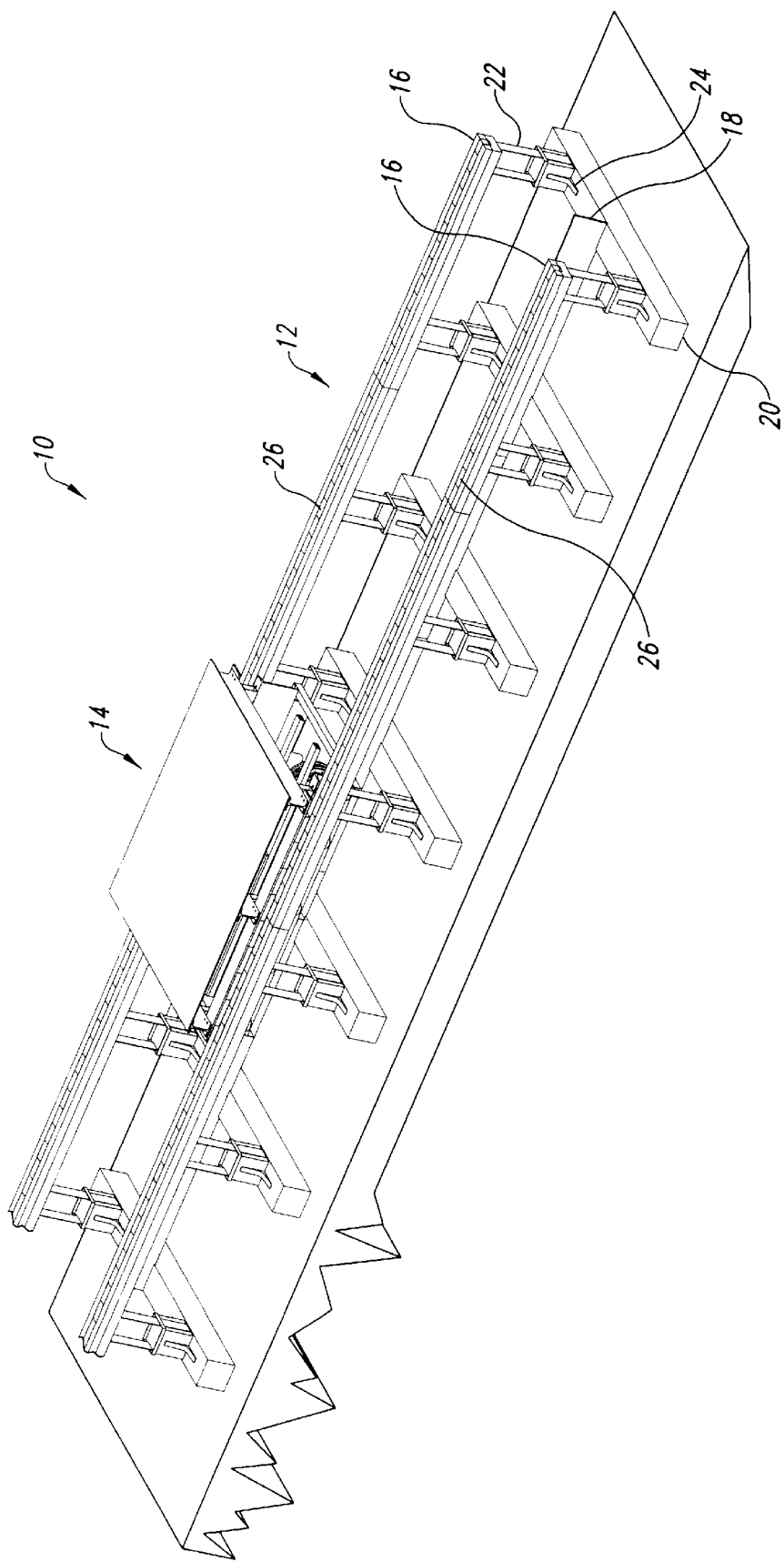
FIG. 1 is an isometric view of a track and a cart levitating above the track according to one embodiment of he present invention.

FIG. 1 illustrates a system 10 for levitating and accelerating objects. The system 10 incorporates a track 12 and a cart 14 configured to move longitudinally in either direction with respect to the track. The track 12 incorporates a pair of supporting rails 16 and a driving rail 18.

In the illustrated embodiment, the supporting rails 16 and the driving rail 18 are supported by a number of footings 20 spaced apart from each other along a length of track 12. The footings 20 are anchored to the ground as generally understood in the art. The driving rail 18 in the illustrated embodiment is mounted directly to the footings 20, such as by a flange formed at the lower edge of the driving rail. The illustrated driving rail 18 is centrally located along the length of each of the footings 20. Depending on the particular design of the cart 14, however, it is envisioned that the driving rail 18 can be positioned at other locations inside, outside, above and below the supporting rails 16, as would be appreciated by one of ordinary skill in the relevant art.

In the illustrated embodiment, the supporting rails 16 are coupled to the footings 20 by a number of posts 22 and brackets 24, and extend along opposing ends of the footings. As with the driving rail 18, however, different configurations are possible, as one of ordinary skill in the art would appreciate.

The upper surface of each of the supporting rails 16 carries a number of permanent magnets 26 extending along an operable portion of its length. In the illustrated embodiment, the permanent magnets 26 in the supporting rails 16 are all of a common length. The illustrated permanent magnets 26 are butted against each other along the length of the track 12 to provide a magnetic force that is sufficiently constant to enable the cart 14 to move smoothly along the track. The permanent magnets 26 are oriented such that every magnet along the respective supporting rail 16 has its polarity vertically aligned with the adjacent permanent magnets. The inventor appreciates that it is not necessary that every permanent magnet 26 be aligned in order for the invention to operate. The illustrated embodiment, however, is provided as an example of one preferred embodiment.

Figure 2:
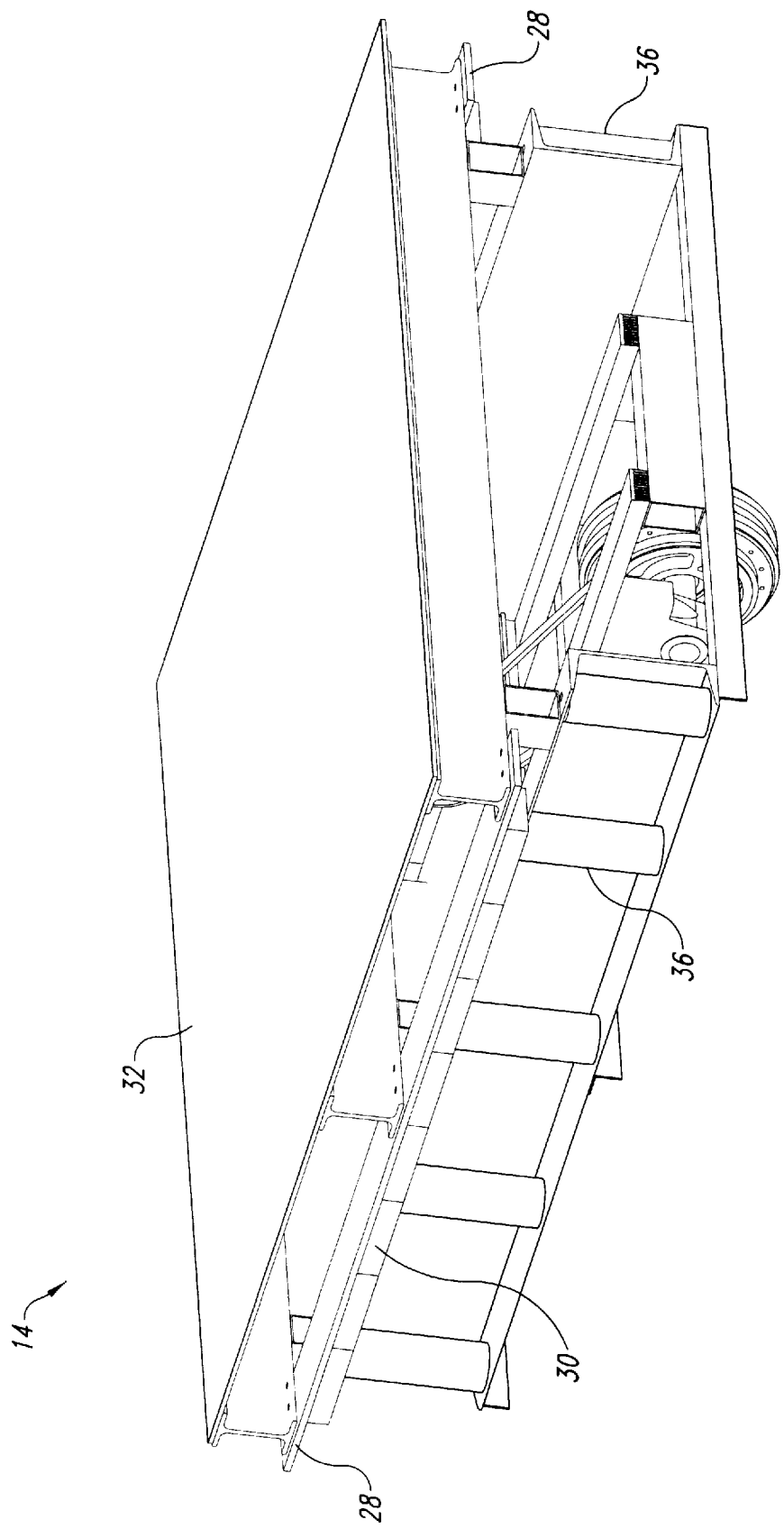
FIG. 2 is an isometric view of the cart of FIG. 1.
Figure 3:
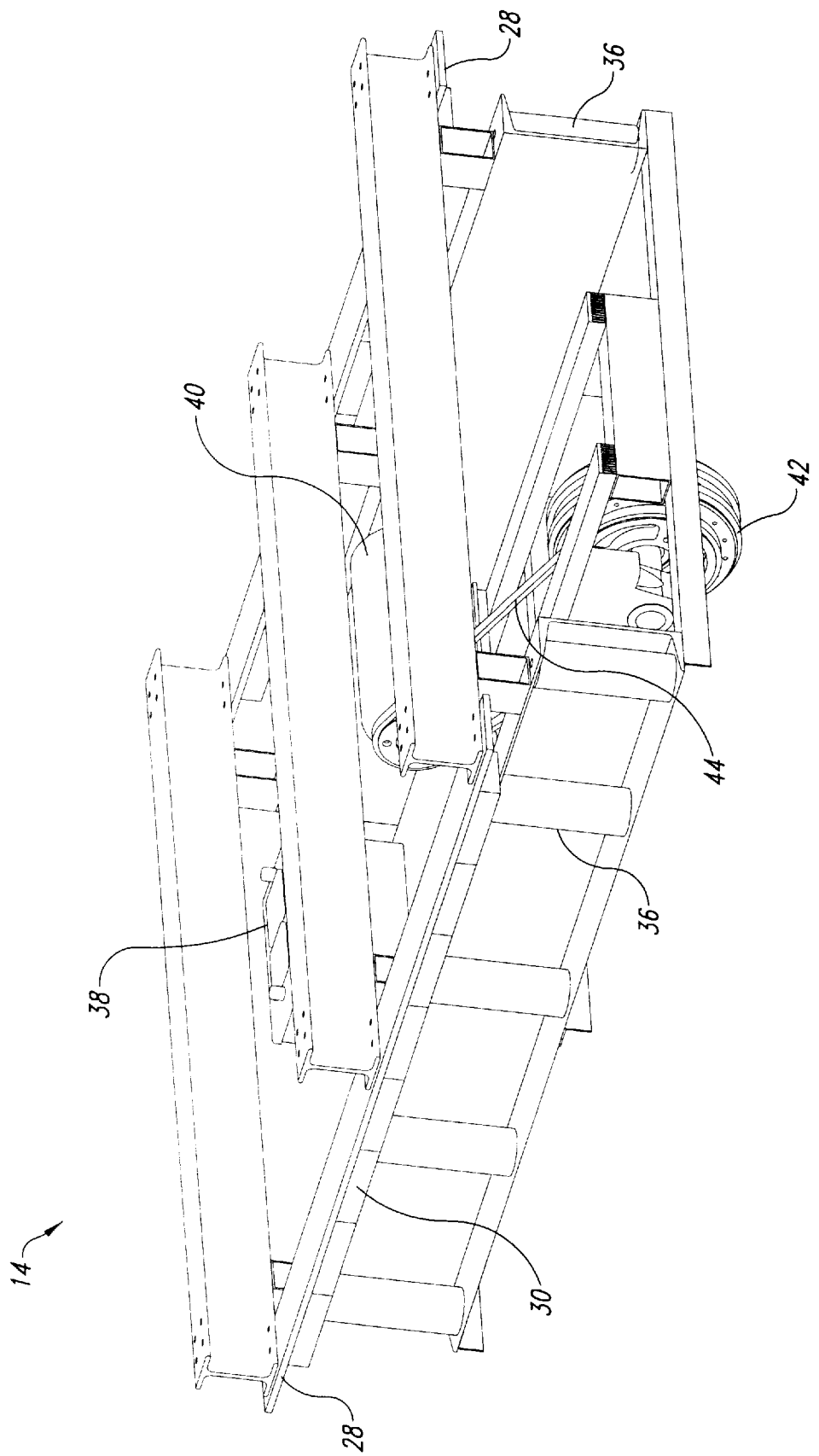
FIG. 3 is an isometric view of the cart of FIG. 2 with a platform removed therefrom.

FIGS. 2 and 3 best illustrate the cart 14 according to this particular embodiment of the present invention. The cart 14 incorporates a pair of opposing side rails 28 spaced apart to generally align with the supporting rails 16 on the track 12. In the illustrated embodiment, the side rails are made from a ferrous material such as steel. Other materials of like qualities can be substituted for steel.

Attached to the underside of each of the side rails 28 is another set of permanent magnets 30 that align with the permanent magnets 26 on the supporting rails 16 when the cart 14 is engaged with the track 12. In the illustrated embodiment, the permanent magnets 30 in the side rails 28 are all of a common length. The length of each permanent magnet 26 in the supporting rail 16 is different, in this case longer, than the length of the permanent magnet 30 in the side rail 28. One of ordinary skill in the art, after reviewing this disclosure, will immediately appreciate that the difference in length prevents two adjacent seams in the support rail permanent magnets 26 from simultaneously aligning with two adjacent seams in the side rail permanent magnets 30, thus avoiding magnetic cogging. The permanent magnets 30 on the cart 14 are oriented with their polarities opposite to those of the permanent magnets 26 of the supporting rails 16. As a result, the cart 14 levitates above the track 12. In the illustrated embodiment, the permanent magnet 30 attached to the side rails 28 are abutted one against the next. The inventor appreciates, however, that these permanent magnets need not be in contact with each other for the cart 14 to have a smooth ride over the track 12.

The cart 14 has a platform 32 (FIG. 2) for carrying individuals or objects. The present invention can be configured for carrying cargo or people and, as a result, the platform 32 can have a wide variety of configurations. For example, platform 32 can be in the shape of a train car or a cargo container. Likewise, the platform 32 and the cart 14 can be sized for carrying only small objects.

The sides of the cart 14 have a number of rollers 36 spaced apart lengthwise along the cart. Rollers 36 are positioned to contact the supporting rails 16 should the cart move out of proper alignment with the track 12. The rollers 36 rotate about vertical axes, and consequently do not significantly affect the movement of the cart 14 along the track 12. It is envisioned by the inventor that a wide variety of means can be substituted for the rollers 36 to keep the cart 14 centered along the track 12.

As illustrated in FIG. 3, a battery 38, a motor 40 and a driving disc 42 are housed within this particular cart 14. The illustrated battery 38 is a 12-volt battery similar to one currently used in an automobile. The inventor appreciates, however, that a wide variety of power sources can be substituted for the battery 38, such as a fuel cell.

The motor 40 is coupled to the driving disc 42 by a belt 44. The inventor similarly appreciates, however, that the motor 40 and belt 44 can take other configurations, so long as the driving disc 42 can be controllably rotated to accelerate or decelerate the cart 14 with respect to the track 12. An onboard control system 45 (FIG. 6) is incorporated to allow a user to controllably accelerate and decelerate the rotation of the driving disc 42 to control the velocity and acceleration of the cart 14.

Figure 4:
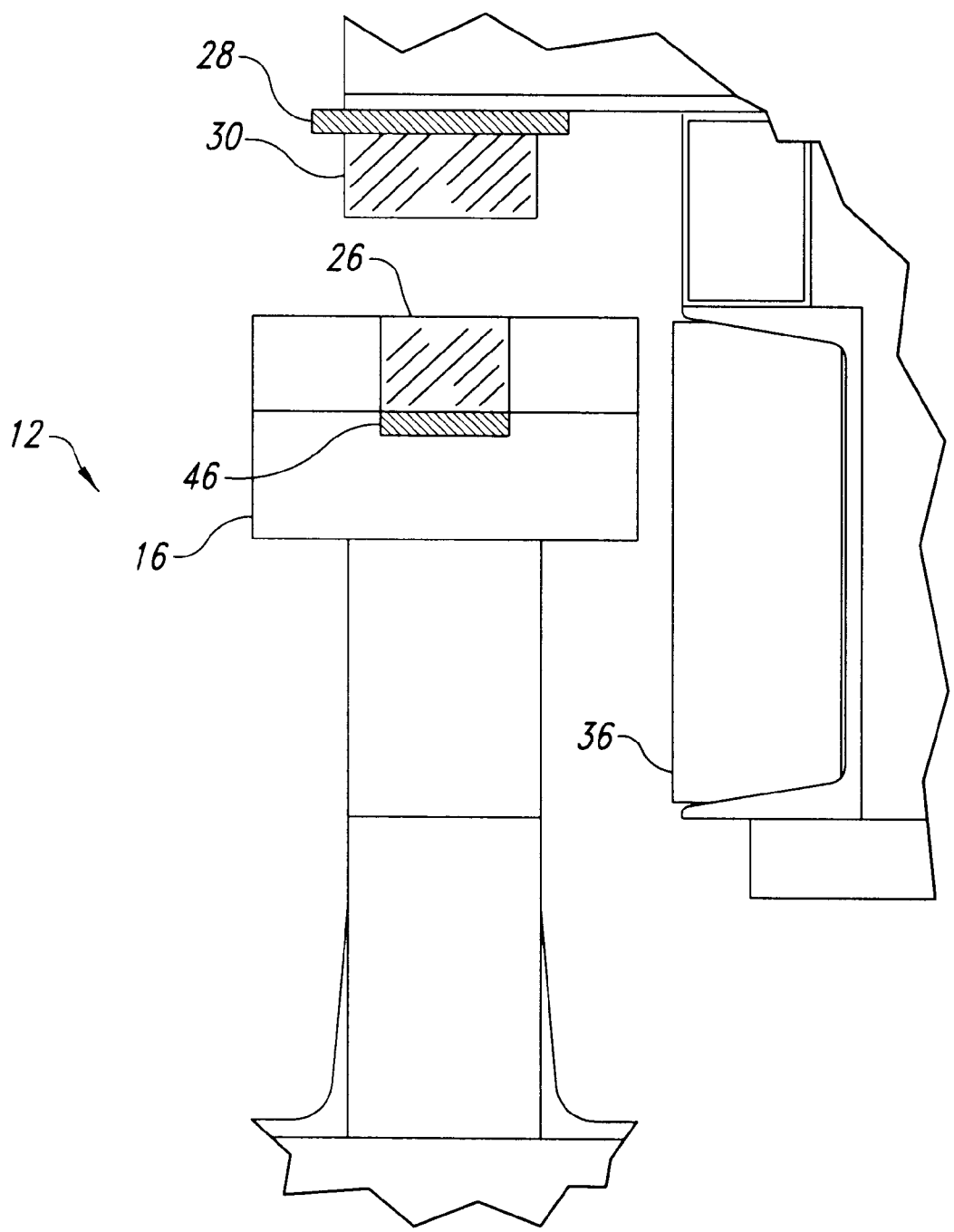
FIG. 4 is an end view of a portion of the track and cart of FIG. 1.

FIG. 4 illustrates the relative orientation of the permanent magnets 30 on the side rails 28 of the cart 14 when engaged with the track 12. As discussed above, the polarity of the permanent magnets 30 is opposite the polarity of the permanent magnets 26. In addition, in this particular embodiment, the lateral dimension of the permanent magnets 30 is greater than the lateral dimension of the permanent magnets 26. The inventor appreciates that these permanent magnets 26, 30 can have the same dimensions, or the permanent magnets 26 could be larger than the permanent magnets 30. One of ordinary skill in the art will appreciate, however, that when the magnets are of the same width, as seen in the prior art, additional lateral support and/or controls are necessary to maintain optimal lateral stability between the magnets. On the contrary, in the illustrated embodiment, the magnetic footprint of the upper magnet 30 is wider than that of the lower magnet 26, naturally providing additional lateral stability.

A ferrous backing material 46 is positioned under the permanent magnets 26 in the supporting rail 16. As with the side rails 28, the ferrous backing material 46 can be steel or an equivalent materials. The backing 46 extends along the length of the side rail 16.

Figure 5:
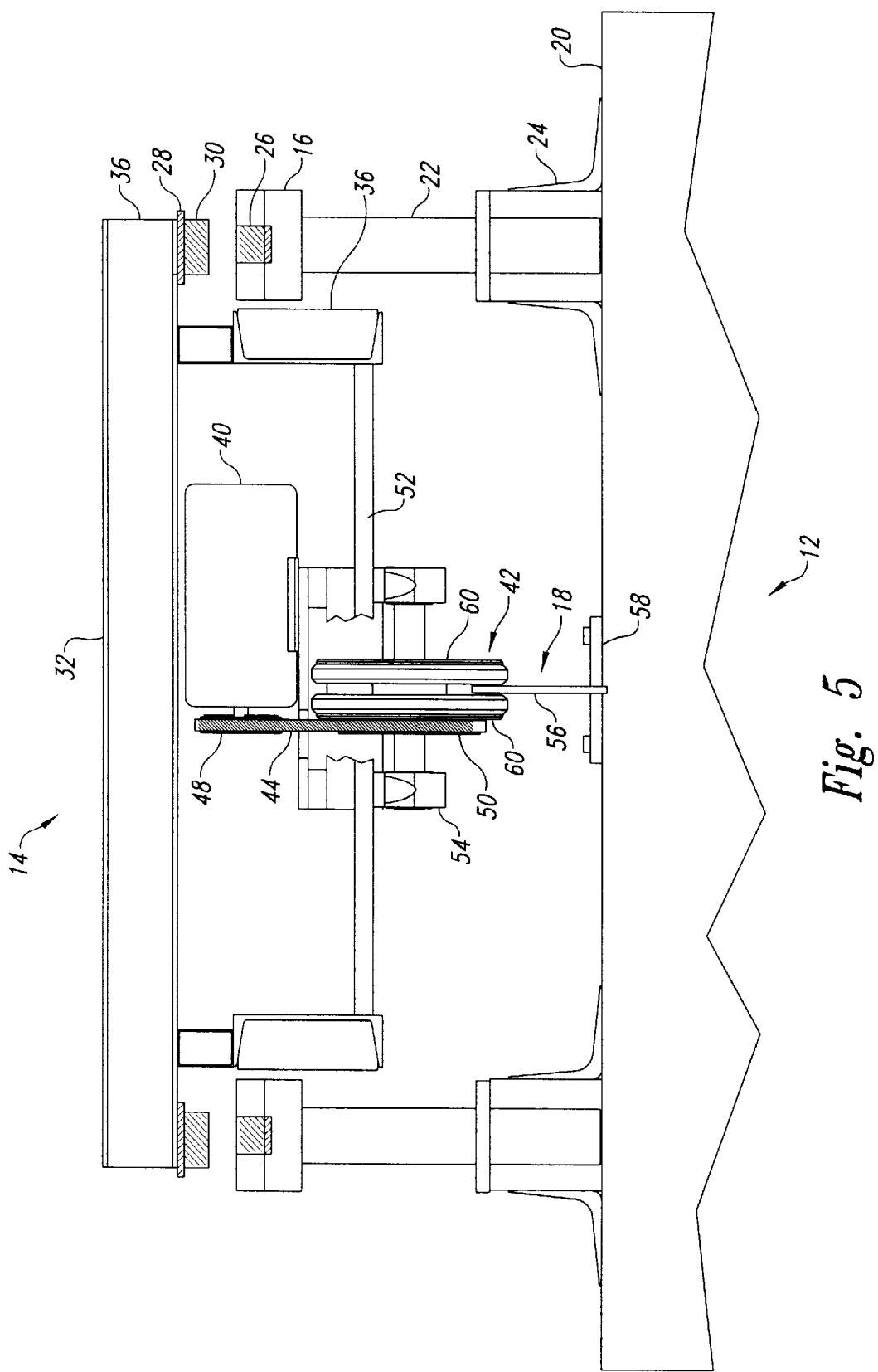
FIG. 5 is an end view of the track and cart of FIG. 1.
Figure 6:
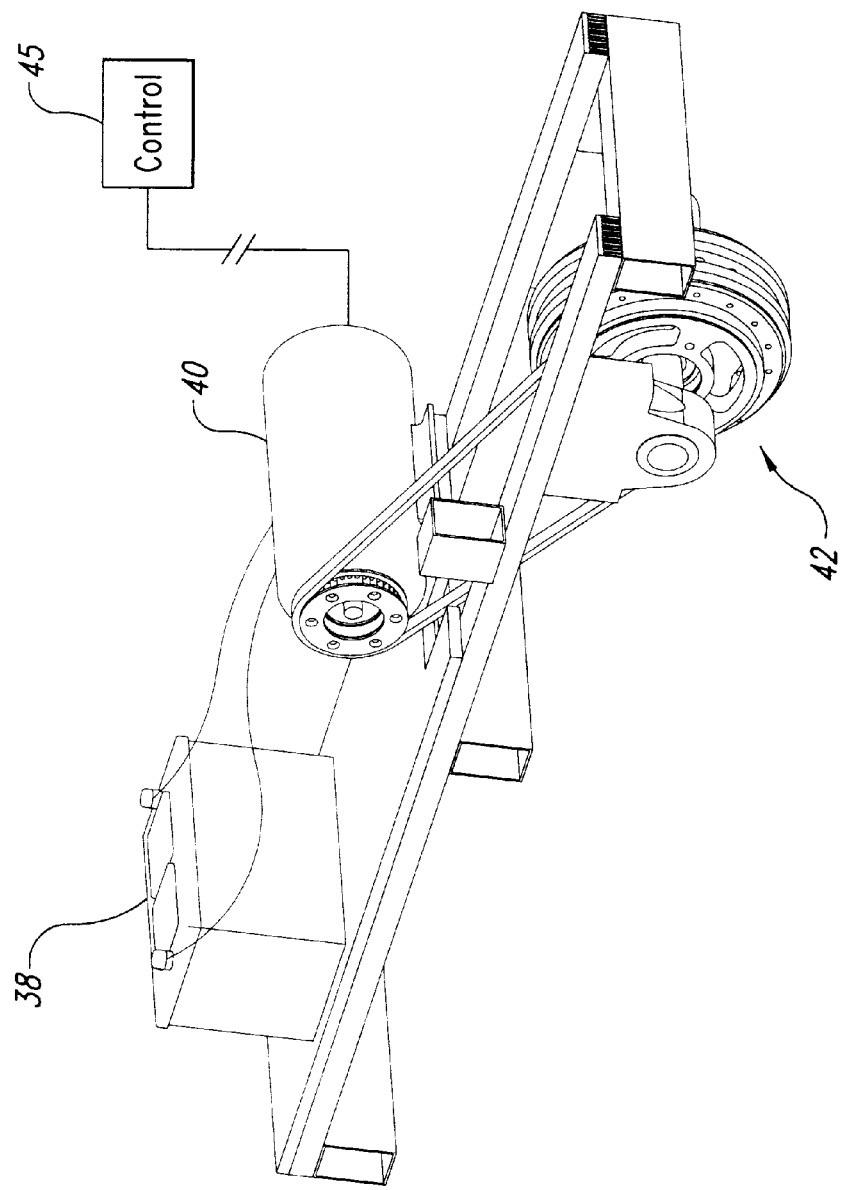
FIG. 6 is an isometric view of a drive assembly of the cart of FIG. 1.

As best illustrated in FIG. 5, a driving pulley 48 on the motor 40 operates the belt 44 to rotate a driven pulley 50 attached to the driving disc 42. The motor 40 is mounted on a cross-member 52, which is in turn mounted to the cart 14. Similarly, the driving disc 42 is mounted to an underside of the cross-member 52. The driving disc 42 is rotatably mounted on a pair bearings 54 to rotate with respect to the cart 14.

Figure 7:
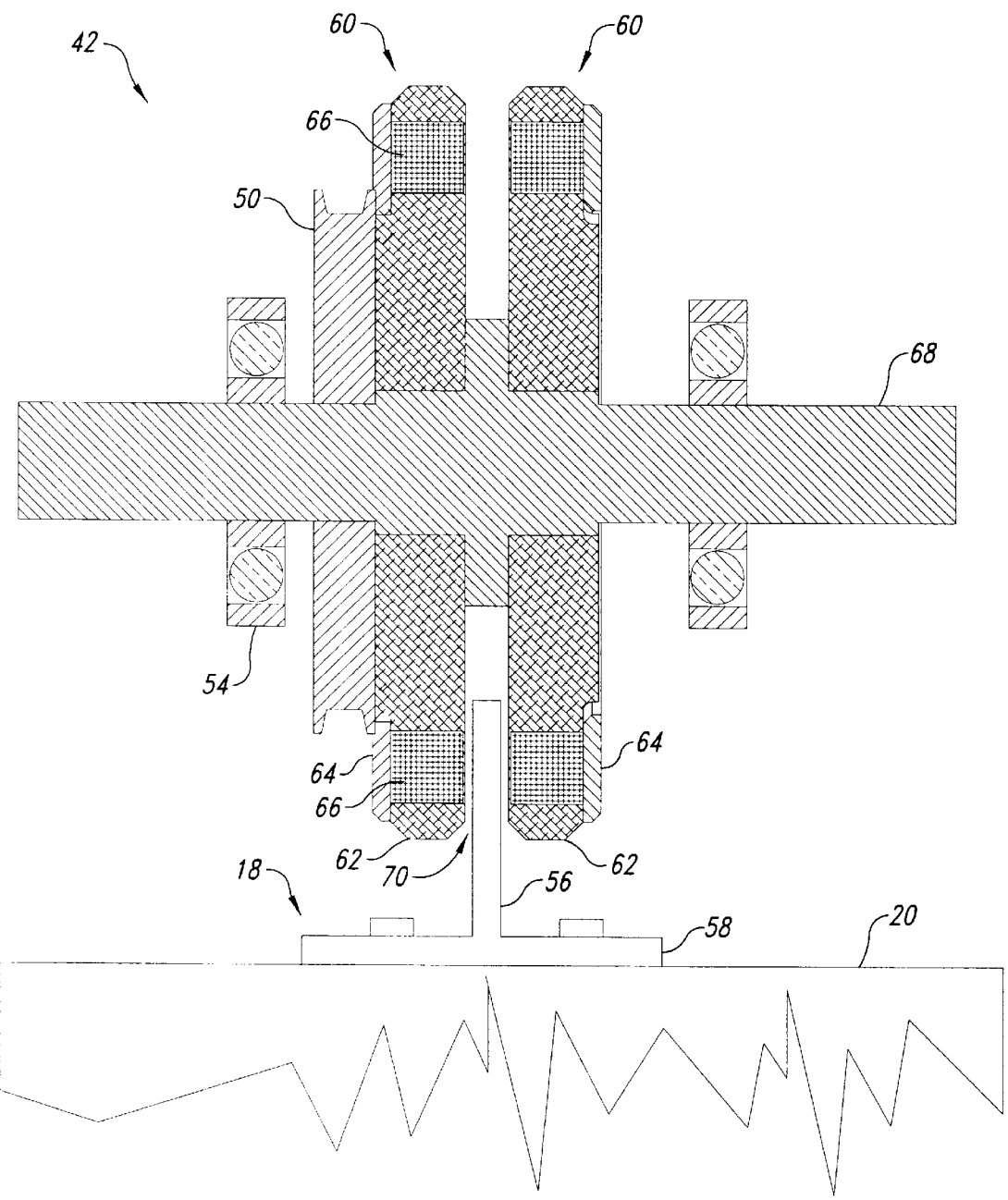
FIG. 7 is a sectional elevation view of a disc from the drive assembly of FIG. 6 engaged with a third rail of the track of FIG. 1, shown along a diametric section.
Figure 8:
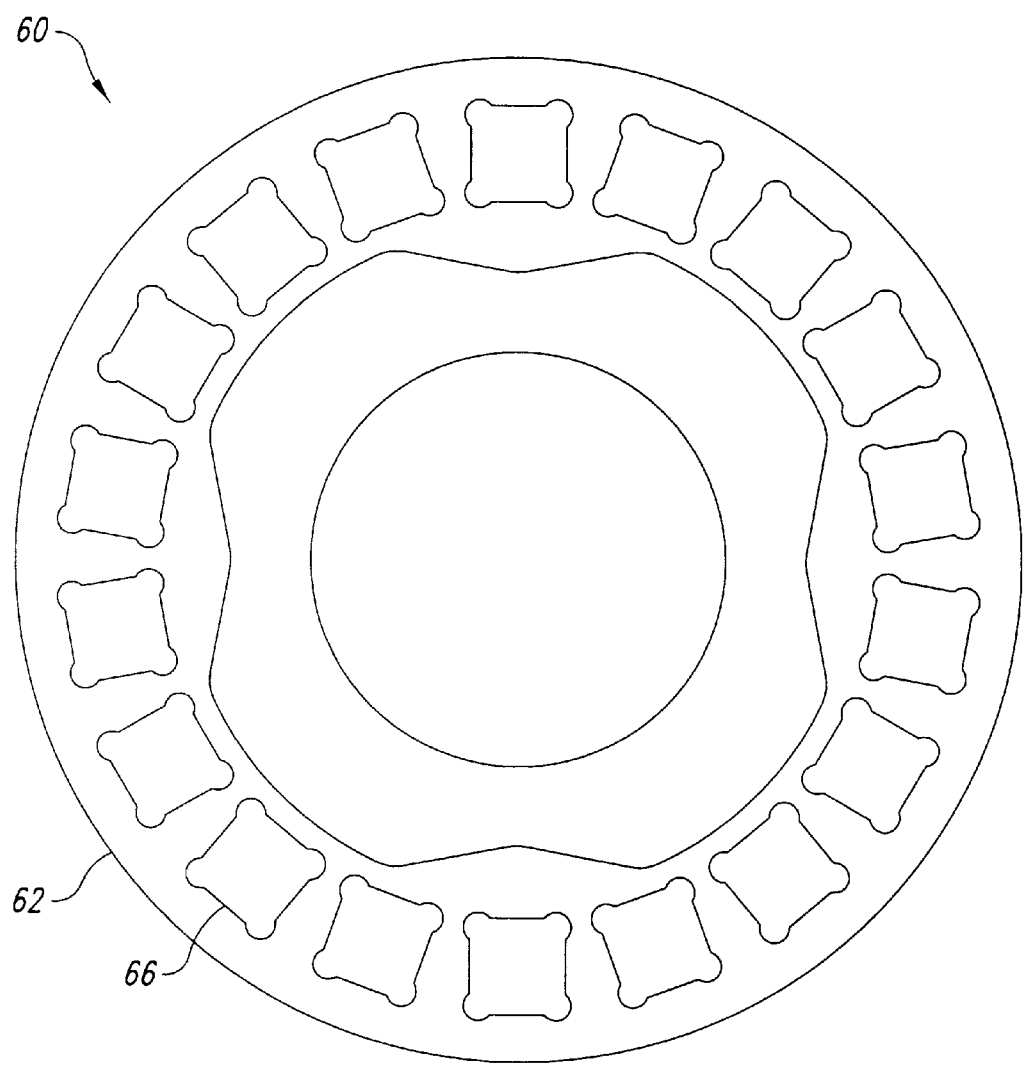
FIG. 8 is a side view of one of the discs of FIG. 7.

As illustrated in FIG. 7, the third rail 18 has a neck 56 and a flange 58. The flange 58 is mounted to the footing 20 to retain the third rail 18 in a fixed alignment with respect to the track 12. The neck 56 is in the form of a flat plate extending the length of the track 12. The driving disc 42 in the illustrated embodiment has a pair of magnet rotors 60, spaced one on each side of the neck 56 of the third rail 18. Each of the magnet rotors 60 has a non-ferrous mounting disc 62 backed by a ferrous backing disc 64, preferably of mild steel. The mounting discs 62 may be aluminum or a suitable non-magnetic composite, and each is fabricated with a number of permanent magnets 66 spaced apart from each other and arranged in a circle about a shaft 68 carrying the driving disc 42. Each of the permanent magnets 66 abuts on the outside of the driving disc 42 against the respective backing disc 64. Adjacent permanent magnets 66 may have their polarities reversed. The permanent magnets 66 are each spaced by an air gap 70 from the neck 56.

The mounting discs 62 are mounted to the shaft 68 to rotate in unison with the shaft. Rotation of the driving disc 42 with respect to the neck 56 results in relative movement between the permanent magnets 66 and the neck in a direction generally tangential to the driving disc. This tangential direction aligns with the length of the track. As is generally known in the industry, relative movement between a permanent magnet and an electroconductive material results in an eddy current urging the electroconductive material to follow the permanent magnets. In the present case, however, because the electroconductive material in the neck 56 is fixed to the footing 20, the electroconductive material cannot follow the permanent magnets. Instead, an equal and opposite force is exerted on the cart which carries the permanent magnets 66. This opposing force accelerates the cart in a direction opposite to the movement of the permanent magnets 66. Accordingly, controlled rotation of the driving disc 42 with respect to the neck 56 can accelerate or decelerate the cart 14 with respect to the track 12.

It also understood in the industry that adjustable gap couplings can be used to increase and decrease the resultant forces between the permanent magnets 66 and the neck 56. The inventor incorporates herein by reference U.S. Pat. Nos. 6,005,317; 6,072,258; and 6,242,832 in their entireties to disclose various structures that can be used to adjust the spacing between the permanent magnets 66 and the neck 56. Further, the inventor appreciates that a single magnet rotor 62 can be used instead of a pair of magnet rotors.

Embodiments of the present invention have numerous advantages over conveyance systems of the prior art. For example, the aligned polarities in the tracks and the ferrous backing material combine to create a powerful and consistant magnetic force which allows substantial weight to be carried and allows for smooth movement as the weight is transported along the track. Similarly, ferrous backing material incorporated into the side rails of the cart provides like benefits.

In addition, the magnetic driving disc contained on the cart allows for closely controlled, efficient acceleration and deceleration. Because the driving disc does not contact the third rail, there is no wear between the two parts. Further, because the driving disc is contained on the cart, each cart can be independently controlled to accelerate and decelerate along the track.

The applicant appreciates that many modifications and variations can be made to the embodiments discussed above without diverging from the spirit of the invention. For example, carts can be fabricated with one, two or more driving discs to independently or collectively accelerate and decelerate the cart in the forward and reverse directions. Likewise, more or fewer supporting rails can be incorporated to modify the levitation forces and weight distribution characteristics of a particular system. As discussed above, the driving disc and third rail can be positioned in other locations, such as above the cart for "suspended" configurations. Other modifications and variations would be apparent to those of ordinary skill in the art. Accordingly, the scope of the invention should be interpreted only based on the claims below.

What is claimed is:

1. A system for magnetically levitating and moving an object, the system comprising:
    a track having a plurality of first rails spaced laterally apart from each other along a length of the track, each first rail carrying a plurality of permanent magnets having their poles aligned with each other such that an upper surface of each of the first rails has a uniform polarity along an operable portion of the length;
    an object having a plurality of second rails configured to align with the first rails, each second rail carrying a plurality of permanent magnets oriented to oppose the polarity of the permanent magnets in the corresponding first rail such that the object levitates above the track;
    a third rail projecting upward toward the object and having at least one substantially planar side facing perpendicular to the track, the third rail being made from an electroconductive material, the third rail extending the length of the track; and
    a disc coupled to the object to rotate about a rotary axis with respect to the object, the disc having a plurality of permanent magnets circumferentially spaced about the rotary axis, the disc projecting downward from the object such that at least one of the permanent magnets is in close proximity to the third rail, the disc being controllably rotatable in the presence of the third rail to create an eddy current between the permanent magnets in the disc and the electroconductive material of the third rail to accelerate and decelerate the object with respect to the track.

2. The system of claim 1 wherein the plurality of first rails comprises two first rails.

3. The system of claim 1 wherein each of the plurality of permanent magnets in the first rail is in contact with the adjacent permanent magnets in the respective first rail.

4. The system of claim 1 wherein a lateral dimension of the permanent magnets in the first rails is different from a corresponding lateral dimension of the permanent magnets in the second rails.

5. The system of claim 1 wherein a lateral dimension of the permanent magnets in the first rails is smaller than a corresponding lateral dimension of the permanent magnets in the second rails.

6. The system of claim 1, further comprising a ferrous keeper member in contact with the plurality of permanent magnets in at least one of the first rails.

7. The system of claim 1, further comprising a first ferrous keeper member in contact with the plurality of permanent magnets in at least one of the first rails and a second ferrous keeper member in contact with the plurality of permanent magnets in at least one of the second rails.

8. The system of claim 1, further comprising a ferrous keeper member in contact with the plurality of permanent magnets in each of the first rails, the keeper member being positioned on a surface of the permanent magnets furthest from the upper surface of the rail.

9. The system of claim 1, further comprising guide members coupled to the track and the object to maintain the object aligned with the track.

10. The system of claim 1, further comprising rollers coupled to the object, the rollers being spaced apart by a gap from the rails maintain the object aligned with the track.

11. A system for magnetically levitating and moving an object, the system comprising:
    a track having a plurality of first rails spaced laterally apart from each other along a length of the track, each first rail carrying a plurality of permanent magnets having their poles aligned with each other such that an upper surface of each of the first rails has a uniform polarity along an operable portion of the length;
    an object having a plurality of second rails configured to align with the first rails, each second rail carrying a plurality of permanent magnets oriented to oppose the polarity of the permanent magnets in the corresponding first rail such that the object levitates above the track;
    a third rail projecting upward toward the object and having at least one substantially planar side facing perpendicular to the track, the third rail being made from an electroconductive material, the third rail extending the length of the track;
    a disc coupled to the object to rotate about a rotary axis with respect to the object, the disc having a plurality of permanent magnets circumferentially spaced about the rotary axis, the disc projecting downward from the object such that at least one of the permanent magnets is in close proximity to the third rail, the disc being controllably rotatable in the presence of the third rail to create an eddy current between the permanent magnets in the disc and the electroconductive material of the third rail to accelerate and decelerate the object with respect to the track; and a ferrous keeper and an electroconductive cover on each of the first rails, the keeper being in contact with the plurality of permanent magnets in the first rail and being positioned of a surface of the permanent magnets furthest from the upper surface of the rail, the cover being positioned over the upper surface of the first rail.

12. A system for magnetically levitating and moving an object, the system comprising:

a track having a plurality of first rails spaced laterally apart from each other along a length of the track, each first rail carrying a plurality of permanent magnets having their poles aligned with each other such that an upper surface of each of the first rails has a uniform polarity along an operable portion of the length;

an object having a plurality of second rails configured to align with the first rails, each second rail carrying a plurality of permanent magnets oriented to oppose the polarity of the permanent magnets in the corresponding first rail such that the object levitates above the track;

a third rail projecting upward toward the object and having at least one substantially planar side facing perpendicular to the track, the third rail being made from an electroconductive material, the third rail extending the length of the track;

a disc coupled to the object to rotate about a rotary axis with respect to the object, the disc having a plurality of permanent magnets circumferentially spaced about the rotary axis, the disc projecting downward from the object such that at least one of the permanent magnets is in close proximity to the third rail, the disc being controllably rotatable in the presence of the third rail to create an eddy current between the permanent magnets in the disc and the electroconductive material of the third rail to accelerate and decelerate the object with respect to the track; and guide members coupled to the track and complementary rollers coupled to the object to maintain the object aligned with the track.

13. A system for magnetically levitating and moving an object, the system comprising:

a track having a plurality of first rails spaced laterally apart from each other along a length of the track, each first rail carrying a plurality of permanent magnets having their poles aligned with each other such that an upper surface of each of the first rails has a uniform polarity along an operable portion of the length;

an object having a plurality of second rails configured to align with the first rails, each second rail carrying a plurality of permanent magnets oriented to oppose the polarity of the permanent magnets in the corresponding first rail such that the object levitates above the track;

a third rail projecting upward toward the object and having at least one substantially planar side facing perpendicular to the track, the third rail being made from an electroconductive material, the third rail extending the length of the track; and a disc coupled to the object to rotate about a rotary axis with respect to the object, the disc having a plurality of permanent magnets circumferentially spaced about the rotary axis, the disc projecting downward from the object such that at least one of the permanent magnets is in close proximity to the third rail, the disc being controllably rotatable in the presence of the third rail to create an eddy current between the permanent magnets in the disc and the electroconductive material of the third rail to accelerate and decelerate the object with respect to the track;

wherein the third rail is in the form of an elongated plate and the rotary axis is at least substantially perpendicular to the plate.

14. A system for magnetically levitating an object, the system comprising:

a track having a plurality of first rails spaced laterally apart from each other along a length of the track;

a first plurality of permanent magnets coupled to the first rails, the first plurality of permanent magnets having their poles aligned such that an upper surface of each of the first rails has a substantially uniform polarity along an operable portion of the length, each of the first plurality of permanent magnets in the first rail being in contact with the adjacent permanent magnets;

a ferrous first keeper positioned against a bottom surface of each of the first rails, the ferrous first keeper contacting the first plurality of permanent magnets;

an electroconductive cover positioned over the upper surface of each of the first rails;

an object having a plurality of second rails at least substantially aligned with a portion of the length of the plurality of first rails;

a second plurality of permanent magnets aligned to oppose the polarity of the permanent magnets in the first rails such that the object levitates above the track; and a ferrous second keeper in each second rail contacting the second plurality of permanent magnets.

15. The system of claim 14, further comprising a third rail and a drive disc, the third rail made from an electroconductive material and extending the length of the track, the drive disc being coupled to the object to rotate about a rotary axis with respect to the object, the drive disc having a plurality of permanent magnets spaced about the rotary axis, the drive disc being positioned with a portion thereof in close proximity to the third rail and being controllably rotatable in the presence of the third rail to create an eddy current between the permanent magnets in the drive disc and the electroconductive material of the third rail to accelerate and decelerate the object with respect to the track.

16. The system of claim 14 wherein a lateral dimension of the first plurality of permanent magnets is different from a corresponding lateral dimension of the second plurality of permanent magnets.

17. The system of claim 14 wherein a lateral dimension of the first plurality of permanent magnets is smaller than a corresponding lateral dimension of the second plurality of permanent magnets.

18. The system of claim 14 wherein the first keeper member is positioned on a surface of the first plurality of permanent magnets furthest from the upper surface of the rail.

19. The system of claim 14, further comprising guide members coupled to the track and the object to maintain the object aligned with the track.

20. The system of claim 14, further comprising rollers coupled to the object, the rollers being spaced apart by a gap from the rails maintain the object aligned with the track.

21. A system for magnetically levitating an object, the system comprising:

a track having a plurality of first rails spaced laterally apart from each other along a length of the track;

a first plurality of permanent magnets coupled to the first rails, the first plurality of permanent magnets having their poles aligned such that an upper surface of each of the first rails has a substantially uniform polarity along an operable portion of the length, each of the first plurality of permanent magnets in the first rail being in contact with the adjacent permanent magnets;

a ferrous first keeper positioned against a bottom surface of each of the first rails, the ferrous first keeper contacting the first plurality of permanent magnets;

an electroconductive cover positioned over the upper surface of each of the first rails;

an object having a plurality of second rails at least substantially aligned with a portion of the length of the plurality of first rails;

a second plurality of permanent magnets aligned to oppose the polarity of the permanent magnets in the first rails such that the object levitates above the track;

a ferrous second keeper in each second rail contacting the second plurality of permanent magnets; and guide members coupled to the track and complementary rollers coupled to the object to maintain the object aligned with the track.

22. A system for magnetically levitating an object, the system comprising:

a track having a plurality of first rails spaced laterally apart from each other along a length of the track;

a first plurality of permanent magnets coupled to the first rails, the first plurality of permanent magnets having their poles aligned such that an upper surface of each of the first rails has a substantially uniform polarity along an operable portion of the length, each of the first plurality of permanent magnets in the first rail being in contact with the adjacent permanent magnets;

a ferrous first keeper positioned against a bottom surface of each of the first rails, the ferrous first keeper contacting the first plurality of permanent magnets;

an electroconductive cover positioned over the upper surface of each of the first rails;

an object having a plurality of second rails at least substantially aligned with a portion of the length of the plurality of first rails;

a second plurality of permanent magnets aligned to oppose the polarity of the permanent magnets in the first rails such that the object levitates above the track; and a ferrous second keeper in each second rail contacting the second plurality of permanent magnets;

wherein the third rail is in the form of an elongated plate and the rotary axis is at least substantially perpendicular to the plate.

23. A system for magnetically levitating an object having a plurality of first rails spaced laterally apart from each other, each first rail having a first plurality of permanent magnets distributed along its length, the system comprising:

a track having a plurality of second rails positioned to be aligned with the plurality of first rails on the object when the object is levitating above the track;

a second plurality of permanent magnets coupled to the second rails, the second plurality of permanent magnets having their poles aligned such that an upper surface of each of the second rails has a uniform polarity along an operable portion of the length, each of the second plurality of permanent magnets in the first rail being in contact with the adjacent permanent magnets;

an electroconductive cover contacting the second plurality of magnets, the electromagnetic cover being positioned on a side of the second plurality of magnets closest to the upper surface; and a ferrous keeper contacting the first plurality of permanent magnets, the ferrous keeper being positioned on a side of the second plurality of permanent magnets furthest from the upper surface.

24. The system of claim 23 wherein a lateral dimension of the first plurality of permanent magnets is different from a corresponding lateral dimension of the second plurality of permanent magnets.

25. The system of claim 23 wherein a lateral dimension of the first plurality of permanent magnets is smaller than a corresponding lateral dimension of the second plurality of permanent magnets.

26. The system of claim 23, further comprising an electroconductive cover positioned over the upper surfaces of the second rails.

27. A cart for levitating above and moving along a length of a track, the track having a pair of first rails each having a first plurality of permanent magnets of aligned polarity thereon, and a second rail made of electroconductive material extending along the length of the track, the cart comprising:

a pair of third rails at least substantially alignable with the pair of first rails;

a second plurality of permanent magnets aligned to oppose the polarity of the permanent magnets in the first rails such that the object levitates above the track;

a ferrous keeper contacting the second plurality of permanent magnets; and a disc coupled to the cart to rotate about a rotary axis with respect to the cart, the disc having a plurality of permanent magnets spaced about the rotary axis, the disc being positioned with a portion thereof in close proximity to the second rail and being controllably rotatable in the presence of the second rail to create an eddy current between the permanent magnets in the disc and the electroconductive material of the second rail to accelerate and decelerate the object with respect to the track;

wherein the second rail is in the form of an elongated plate and the wherein rotary axis is aligned to be at least substantially perpendicular to the plate.

28. A method for levitating an object above a track, the method comprising:

fixing to the track a first plurality of permanent magnets with substantially all of their polarities upwardly aligned;

magnetically connecting each of the first plurality of permanent magnets to a ferrous material;

providing an object having a second plurality of permanent magnets positioned to align with the track, the second plurality of permanent magnets having their polarities aligned to oppose the first plurality of permanent magnets; and magnetically connecting each of the second plurality of permanent magnets to a ferrous material.

29. A method for levitating an object above a track and moving the object along the track, the method comprising:

fixing to the track a first plurality of permanent magnets with substantially all of their polarities upwardly aligned;

magnetically connecting each of the first plurality of permanent magnets to a ferrous material;

providing an object having a second plurality of permanent magnets positioned to align with the track, the second plurality of permanent magnets having their polarities aligned to oppose the first plurality of permanent magnets;

magnetically connecting each of the second plurality of permanent magnets to a ferrous material;

positioning a rail of electroconductive material along the length of the track; and rotating a disc carrying permanent magnets in the proximity of the rail of electroconductive material such that an eddy force between the rail and the permanent magnets in the disc cause the object to move with respect to the track.

* * * * *